No. 705,515. Patented July 22, 1902.
C. L. DAVIS.
JOINT FOR USE IN PNEUMATIC APPARATUS.
(Application filed Apr. 30, 1900.)
(No Model.)
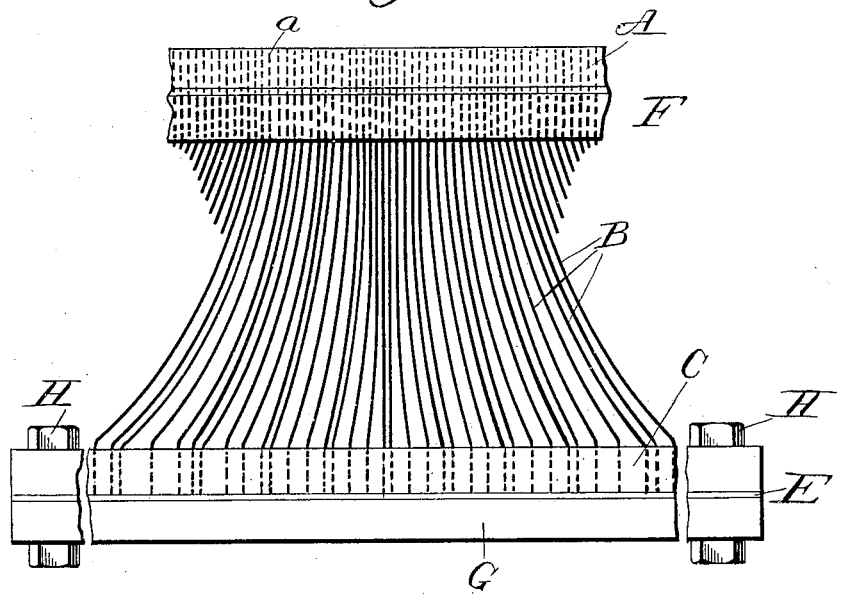
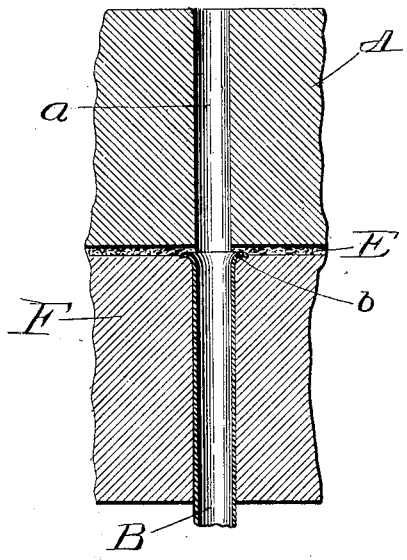
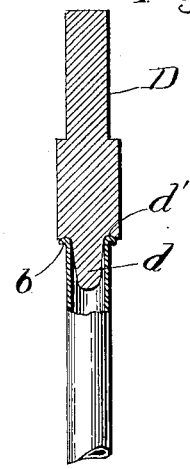
Witnesses
H. S. Gaither
May W. Label
Inventor
Charles L. Davis.
By Charles A. Brown & Cragg.
Attorneys.

UNITED STATES PATENT OFFICE.

CHARLES L. DAVIS, OF CHICAGO, ILLINOIS, ASSIGNOR, BY DIRECT AND MESNE ASSIGNMENTS, TO ENGELINA HEUER, WILLIAM H. HEUER, AND A. MILLER BELFIELD, OF CHICAGO, ILLINOIS.

JOINT FOR USE IN PNEUMATIC APPARATUS.

SPECIFICATION forming part of Letters Patent No. 705,515, dated July 22, 1902.

Application filed April 30, 1900. Serial No. 14,976. (No model.)

*To all whom it may concern:*

Be it known that I, CHARLES L. DAVIS, a citizen of the United States, residing at Chicago, in the county of Cook and State of Illinois, have invented a certain new and useful Improvement in Joints for Use in Pneumatic Apparatus, (Case No. 3,) of which the following is a full, clear, concise, and exact description, reference being had to the accompanying drawings, forming a part of this specification.

My invention relates to means for making joints or connections between tubes, pipes, or other members providing passages for the air in pneumatic apparatus.

The object of my invention is to arrange for an absolutely air-tight joint between such passage-providing members.

One form of apparatus in which it is essential to provide air-tight joints between members providing pneumatic passages is mechanical piano-players. In these instruments, as is well known, there is a series of pneumatics or bellows apparatus for operating a plurality of fingers, which in turn act upon the piano-keys. It is necessary to arrange for the conduction of air to and from these pneumatics in order to properly operate them. This is done generally by means of a tracker-board having a series of ports, the admission of air into which is controlled by a moving sheet or strip of perforated music. From the tracker-board a series of pipes or tubes runs to the pneumatic apparatus for operating the latter in accordance with the air admitted into the ports of the tracker-board. In the present application I have shown my invention as applied in making air-tight joints or connections between the ends of these tubes or pipes. In its broader features, however, it will be understood that the invention is applicable in any other class of apparatus where air-tight joints are desired or necessary.

In the accompanying drawings, Figure 1 is a front view of so much of a mechanical piano-player as is necessary to illustrate my invention. Fig. 2 is a detail view in section of one of the joints. Fig. 3 is a view, partly in section and partly in elevation, of one of the pipes or tubes and a tool conveniently employed for working the same preparatory to making the joint.

Referring first to Fig. 1, A is the tracker-board, which is understood to be suitably mounted and arranged in a mechanical piano-player of any desired construction. The tracker-board A is provided with a series of ports $a$, which are shown in dotted lines. From the tracker-board there extends a series of tubes or pipes B B, which form continuations of the ports $a$ $a$ in the tracker-board. These tubes or pipes B B are understood to run to the portion of the apparatus containing the pneumatics, which are respectively operated by the admission of air into the corresponding tracker-board ports. In the figure referred to I have shown the pipes B B as running to a member C, arranged below the tracker-board A. It will be seen that in this construction the problem presents itself of making absolutely air-tight joints between the ports of the tracker-board A and the upper ends of the tubes or pipes B B and also between the lower ends of these pipes or tubes and the pneumatic apparatus. These joints I have shown made in accordance with my invention.

The tubes or pipes B B in accordance with my invention are generally made of soft metal, such as lead or aluminium. In such case I provide the end of the pipe or tube with a laterally-extending lip or flange $b$, Figs. 2 and 3. This can easily be formed by means of a rotary tool D, having an end portion $d$, adapted to fit into the tube or pipe, and an annular shoulder or button $d'$, adapted to form the flange, as well shown in Fig. 3.

The tube or pipe provided with the lip or flange $b$ is brought against the other member, providing a continuation of the bore of the tube, such member consisting of the tracker-board A in the construction shown in Fig. 2. As a preferred arrangement a piece E of felt or leather or similar material is interposed between the tracker-board A and the lip or flange of the pipe B, as shown in said figure. The member, such as the tracker-board A, and the pipe B being brought firmly and closely together make an absolutely tight joint. By actual experience I have found this joint to be so tight and secure that it is practically impossible for air to leak through it in ordinary circumstances.

Where a large number of pipes or tubes are to have their ends joined to another member, as in the case of a large series of tracker-board tubes B B, the ends of the pipes can be mounted in a single strip or piece of wood F, as shown in Figs. 1 and 2. A sheet or strip of felt or other packing is then desirably interposed between the strip F and the tracker-board A, being conveniently glued to the latter, and the board and strip F are then drawn and held securely together, so as to bring the flanges or lips $b$ $b$ on the pipes closely and firmly against the strip of felt or leather E. This I find makes an absolutely tight joint between the ends of all the tubes and the tracker-board. At the same time it is a convenient arrangement which allows for the removal of the tracker-board A without interfering with the efficacy of the joint and without preventing the same from being subsequently made at any time.

I have shown the member C, carrying the lower ends of the pipes B B, arranged in similar connection with a strip or bar G, arranged below such member C. The strip or bar G is understood to contain ports or passages forming continuations of the tubes B B and to be associated with the pneumatic apparatus, so that the latter will receive air from its ports or passages. The lower ends of the tubes or pipes B B are understood to be provided with lips or flanges, as explained, in connection with their upper ends, and a piece of felt or leather E is interposed between the flanged ends of the tubes and the member G. For securing and holding the members C and G closely and firmly together I have shown bolts H H at their ends.

From the foregoing it will be seen that my invention provides an absolutely tight joint and at the same time one which dispenses with the use of all adhesives, such as glue and the like, and also one which can be easily and quickly taken apart and put together again.

The ends of the tubes or pipes are provided in accordance with my invention with lips or flanges, which extend or project laterally from the sides of the tubes or pipes, as opposed to making the end portions of the same outwardly divergent or flaring. By thus providing the tubes or pipes with flanges or lips instead of making their end portions outwardly divergent or flaring I obtain a number of advantages, among which may be cited the following: First, the flange itself can be jammed against the opposing member, and thereby assure a perfectly-tight connection, which might not be secured by a flaring end portion, because of the fact that the pipe or tube might be pushed into the hole formed for it an extent to bring its end inside of that hole; second, the shrinkage of the wood containing the pipes can occur without injuring the efficiency of the joint, because the flange or lip extends outwardly and covers any space that might be formed between the pipe and the wood when the latter shrinks; third, the expense of construction is less, because it is unnecessary to ream the hole in the wood when a flange or lip is used, as has to be done when a flaring end portion is used.

What I claim as my invention is—

1. In a pneumatic apparatus, the combination of a metallic pipe having its end provided with a laterally-projecting lip or flange, a support or holder for said pipe, the said support or holder being composed of wood, and the pipe or tube being fitted into the same, so that the lip or flange overlaps the surface of the wood, and a member having a port or passage adapted to form a continuation of the bore of the said pipe or tube, the said member being fitted against the wooden support or holder for the pipe or tube, so that the port or passage in the member registers with the bore of the pipe or tube and also so that the rim of said port or passage abuts against the lip or flange which overlaps the surface of the support or holder, and which thus lies and fits closely between the abutting surfaces of said support and said member, substantially as set forth.

2. In a pneumatic apparatus, the combination of a metallic pipe having its end provided with a laterally-projecting lip or flange whose outer edge is bent backwardly, a support or holder for said pipe, the said support or holder being composed of wood and the pipe or tube being fitted into the same, so that the lip or flange overlaps the surface of the wood, and a wooden member having a port or passage adapted to form a continuation of the bore of the said pipe or tube, the said wooden member being fitted against the wooden support or holder for the pipe or tube so that the port or passage in the member registers with the bore of the pipe or tube, and also so that the rim of said port or passage abuts against the lip or flange which overlaps the surface of the support or holder and which thus lies and fits closely between the abutting wooden surfaces of said support and said member, substantially as set forth.

3. In a pneumatic apparatus, the combination of a metallic pipe having its end provided with a laterally-projecting lip or flange, a support or holder for said pipe, the said support or holder being composed of wood and the pipe or tube being fitted into the same so that the lip or flange overlaps the surface of the wood, a wooden member having a port or passage adapted to form a continuation of the bore of the said pipe or tube, the said wooden member being fitted against the wooden support or holder for the pipe or tube, so that the port or passage in the member registers with the bore of the pipe or tube and also so that the rim of said port or passage abuts against the lip or flange which overlaps the surface of the support or holder and which thus lies and fits closely between the abutting wooden surfaces of said support and said member, and a layer of felt interposed between the abutting surfaces of the holder and member, so as to fit against the lip or flange on said pipe or tube, substantially as described.

In witness whereof I hereunto subscribe my name this 26th day of April, A. D. 1900.

CHARLES L. DAVIS.

Witnesses:
E. W. APPLEGATE,
C. E. HUBERT.